United States Patent [19]

Brown et al.

[11] Patent Number: 5,213,842

[45] Date of Patent: May 25, 1993

[54] METHOD OF IMPROVING THE PYROLYTIC DEPOSITION RATE OF COPPER OXIDE FILM ON A GLASS SURFACE

[75] Inventors: Franklin I. Brown, Detroit, Mich.; Stephen C. Schulz, Benicia, Calif.

[73] Assignee: Ford Motor Company, Dearborn, Mich.

[21] Appl. No.: 732,018

[22] Filed: Jul. 18, 1991

[51] Int. Cl.$^5$ .............................................. B05D 5/06
[52] U.S. Cl. ................... 427/168; 427/110; 427/126.2; 427/126.3; 427/165; 427/190; 427/226; 427/314; 427/377; 427/421
[58] Field of Search ............. 427/110, 126.2, 126.3, 427/165, 168, 226, 421, 314, 377, 190

[56] References Cited

U.S. PATENT DOCUMENTS

| | | | |
|---|---|---|---|
| 2,442,976 | 6/1948 | Heany | 427/226 |
| 2,746,210 | 5/1956 | Gaiser | 49/79 |
| 3,446,659 | 5/1969 | Wisman et al. | 427/255.3 |
| 3,607,179 | 9/1971 | Loukes et al. | 65/32 |
| 3,827,870 | 8/1974 | Fogelberg et al. | 65/60 |
| 3,933,457 | 1/1976 | Scholes | 65/60 |
| 4,098,923 | 7/1978 | Alberti et al. | 427/85 |
| 4,325,988 | 4/1982 | Wagner | 427/168 |
| 4,344,986 | 8/1982 | Henery | 427/168 |
| 4,350,514 | 9/1982 | Akiyama et al. | 65/36 |
| 4,397,671 | 8/1983 | Vong | 427/168 |
| 4,401,695 | 8/1983 | Sopko | 427/168 |
| 4,414,015 | 11/1983 | Van Laethem et al. | 65/60.3 |
| 4,615,916 | 10/1986 | Henderson | 427/255 |
| 4,642,130 | 2/1987 | Hargreaves et al. | 65/60.1 |
| 4,753,191 | 6/1988 | Henery | 427/168 |
| 4,830,471 | 5/1989 | Demiryost | 350/357 |
| 4,933,211 | 6/1990 | Sauvinet et al. | 427/168 |

*Primary Examiner*—Janyce Bell
*Attorney, Agent, or Firm*—Charles H. Ellerbrock; Roger L. May

[57] ABSTRACT

A pyrolitic deposition process, for pyrolitic deposition of organo-cupric powder to form copper oxide film, is improved. A substrate is heated, and organocupric powder is sprayed at the substrate, using oxygen gas as the carrier gas. Up to one-third greater deposition rate results, as compared to the process using compressed air as the carrier gas.

1 Claim, No Drawings

METHOD OF IMPROVING THE PYROLYTIC DEPOSITION RATE OF COPPER OXIDE FILM ON A GLASS SURFACE

BACKGROUND OF THE INVENTION

1. Field of the Invention

This invention relates to a pyrolitic deposition process, and more particularly, to pyrolitic deposition of organo-cupric powder for the formation of copper oxide film.

2. Background of the Art

In the formation of electrochromic devices, and in other applications, copper oxide films are employed, and are deposited on glass substrates. U.S. Pat. No. 4,830,471 discloses copper oxide in electrochromic devices, and the content of this patent is incorporated by reference.

It is known to deposit copper oxide film by pyrolitic process. In such a process, a substrate is heated. Cupric acetylacetonate powder is then sprayed on the hot substrate. The cupric acetylacetonate is atomized by compressed air. A film of copper oxide results.

It is an object of this invention to improve the known pyrolitic process by which a copper oxide film is deposited on a substrate such as glass.

An advantage of the invention is that in conditions of actual use, the invention has resulted in a one-third greater deposition rate than the deposition rate of the known process.

Another advantage of the invention is that desirably increased deposition rate may be achieved with minimal change to circumstances of the known process.

DISCLOSURE OF THE INVENTION

This invention is directed to a new pyrolitic deposition process. In particular, this invention is directed to a new pyrolitic process for forming a metal oxide coating on a hot glass substrate.

According to the invention, a metal oxide coating is formed on a hot glass substrate by pyrolysis of a powder at a surface of the substrate. The process of the invention comprises spraying the surface of the substrate with a suspension of powder in oxygen gas.

DETAILED DESCRIPTION OF THE PREFERRED EMBODIMENT

Examples follow of the practice of the prior art, and of the invention, by the inventors.

A substrate, $12'' \times 12'' \times \frac{1}{8}''$, of low E glass (glass with pyrolytic $SnO_2.F$ coating) was heated in a vertical furnace to a temperature of 1080° F. It is believed temperatures in the range of approximately 900° F. to approximately 1135° F. will provide desirable results. Upon exiting the furnace to room temperature, 5 g of cupric acetylacetonate powder was sprayed on the hot glass/-$SnO_2.F$ surface with a Binks model 171, hand-held floccing gun. The distance from the glass/$SnO_2.F$ surface to the gun nozzle was approximately 5 inches. Compressed air was used for atomizing the cupric acetylacetonate powder. The atomization pressure was 50 psi. Each cycle of heating and spraying is called one application. The $Cu_xO$ film was made in two applications The film had a thickness of about 600 A.

Next, an identical substrate was heated identically. The same applications of $Cu_xO$ film were repeated However, dry oxygen gas was used for atomizing the cupric acetylacetonate powder. The dry oxygen gas was, as preferred, 99.999% dry. Process variables and settings were otherwise the same. The $Cu_xO$ film deposited on the glass/$SnO_2.F$ surface had a thickness of about 800 A.

Oxygen gas as the atomization agent resulted in a thicker $Cu_xO$ film. The film was thicker by one-third. It is believed that the use of oxygen gas in the manner described above improved the pyrolytic deposition rate of the $Cu_xO$ film by one-third. It is also believed that ozone gas may provide similar results.

What is claimed is:

1. A pyrolytic deposition process for forming a copper oxide on a hot glass substrate by pyrolysis of cupric acetylacetonate powder at a surface of said substrate, said process comprising spraying said surface with a suspension of said powder in a substantially pure oxygen carrier gas.

* * * * *